April 25, 1939. W. M. WILLETT ET AL 2,156,101
RECIRCULATING HEATING DEVICE
Filed May 25, 1936 3 Sheets-Sheet 2

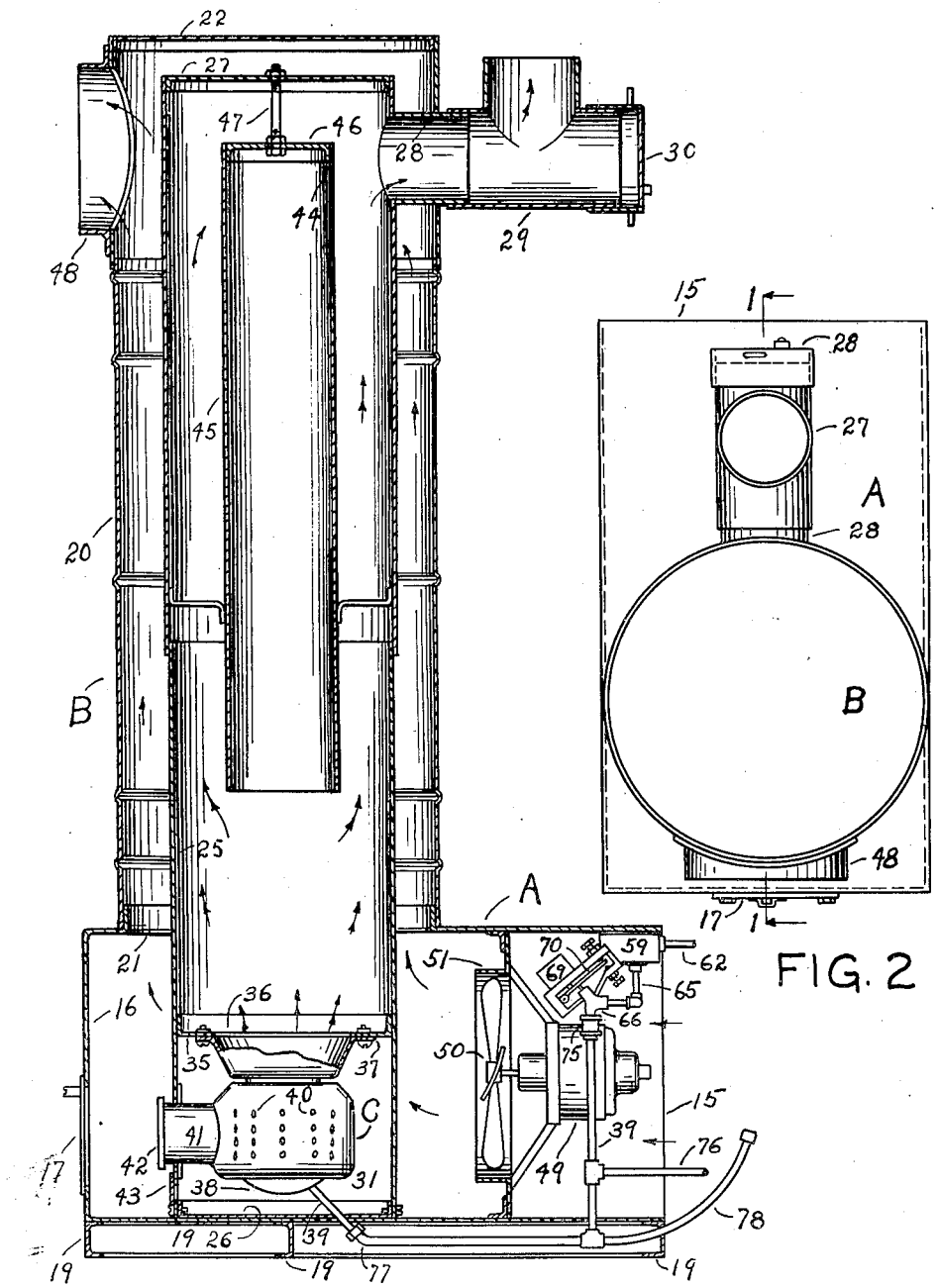

INVENTORS
William M. Willett
George T. Markley
By A. S. Krotz
ATTORNEY

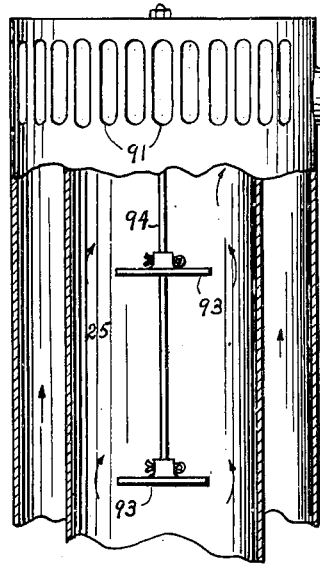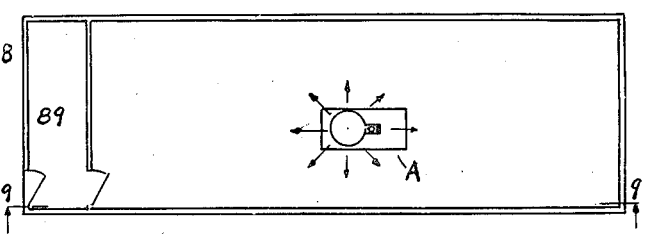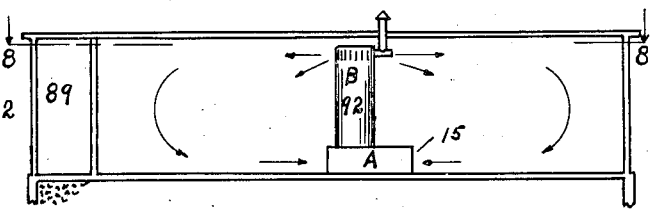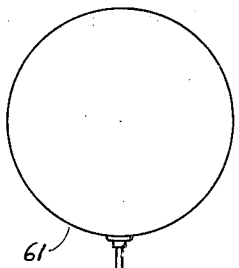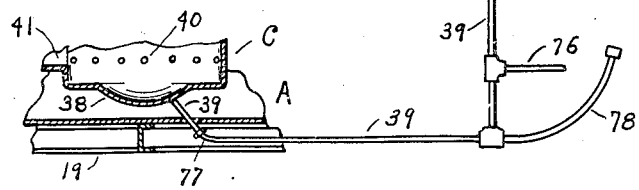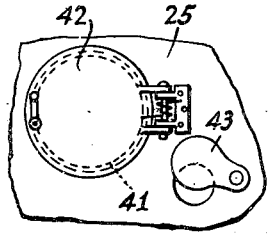

Patented Apr. 25, 1939

2,156,101

UNITED STATES PATENT OFFICE 2,156,101

RECIRCULATING HEATING DEVICE

William M. Willett and George T. Markey, Fort Atkinson, Wis., assignors to James Mfg. Co., Fort Atkinson, Wis.

Application May 25, 1936, Serial No. 81,602

5 Claims. (Cl. 126—110)

The objects of the present invention are to provide a recirculating heater which will economically maintain a uniform temperature in the enclosure served, and wherein the first cost is low, installations easily made with a very simple air duct distributer, or without air ducts, and a device which will operate satisfactorily with very little attention.

We accomplish these objects by means of a novel self contained heating unit, especially adapted to use distillate or kerosene fuel and having air recirculating means which also act to supply a forced draft to the burner and designed whereby it is impossible for gases from the burner to find their way into the recirculating air passageway.

Our device is particularly adapted to heating poultry houses wherein a moderate uniform temperature is desired throughout the enclosure without causing harmful drafts, and wherein if the unit is placed in the enclosure to be heated, there is no danger of the birds coming near or in contact with heated surfaces, and whereby there will be no undesirable warm, cold, or damp zones in the enclosure.

To these and other useful ends our invention resides in features of construction, the parts and combinations thereof, and mode of operation or their equivalents, as herein set forth and claimed and shown in the accompanying drawings in which:

Fig. 1 is a sectional elevation of our preferred form of heating unit taken on line 1—1 of Figure 2, not including the burner, fan, motor and fuel feeding device.

Fig. 2 is a top view of the unit as shown in Figure 1.

Fig. 7 is a fractional view of a modification part being shown in section.

Fig. 8 is a ground plan view showing our unit heater positioned in the room served having air outlets as in Figure 7, the upper portion of the building being removed on line 8—8 of Figure 9.

Fig. 9 is a side elevation of the device and building as shown in Figure 8, the front of the building being removed on line 9—9 of Figure 8.

Fig. 10 is a diagrammatic drawing illustrating the preferred form of our improved fuel control device.

Fig. 11 is an enlarged fraction of the chimney illustrating the door to the burner and the burner air regulating damper.

Figure 3:
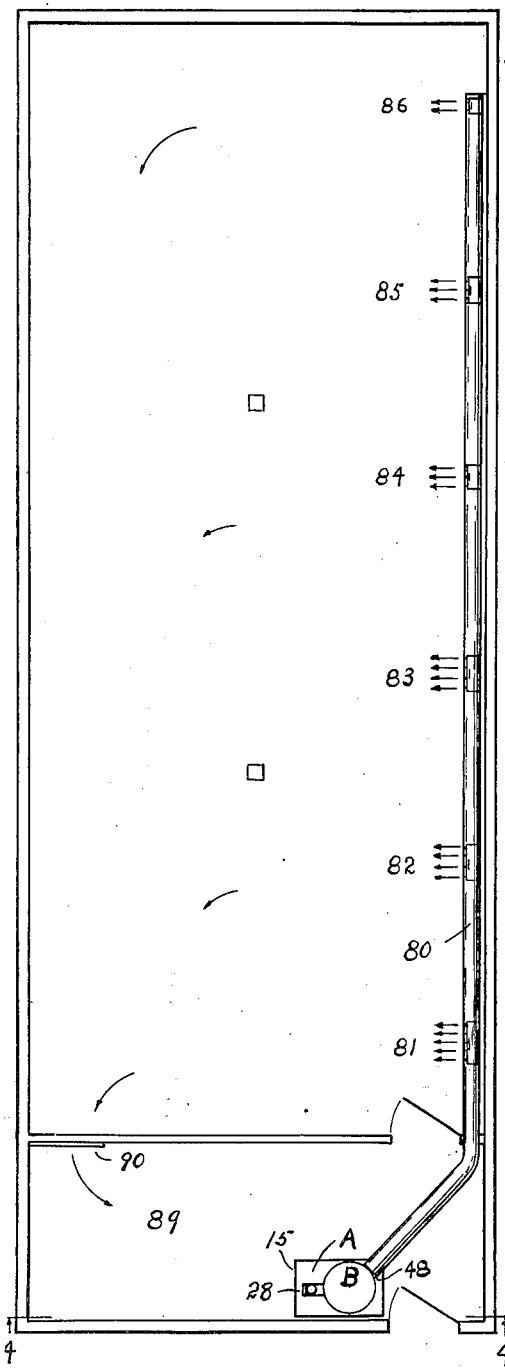
Fig. 3 is a ground plan of our device as disclosed in Figures 1 and 2 and as installed in a poultry house, a portion of the building being removed on line 3—3 of Figure 4.

As thus illustrated our heating unit, in its preferred form, comprises a base which, in its entirety, is designated by reference character A, and a vertically extending heat transfer device which is, in its entirety, designated by reference character B. Base A preferably consists of an extended enclosure, one end of which is left open as at 15, forming an air inlet, the rear end being closed as at 16 and having an opening which is covered by a hinged door 17 with a self closing spring (not shown). The purpose of this door will hereinafter appear.

We provide channel iron supporting members 19 to which the bottom of unit A is attached as illustrated. Unit B comprises a duct 20 which is preferably circular in cross section and of considerable length and is secured to base A by means of a flanged opening 21. The upper end of member 20 is closed at at 22. We provide a chimney 25, each end being closed as at 26 and 27. The lower end of this chimney rests on the bottom of member A, the upper end stopping short of member 22 as illustrated, and having a side outlet 28 which protrudes through the wall of member 20, having on its end a standard stove pipe T 29, having preferably a check damper 30.

In Figure 1 we illustrate our preferred form of burner which is, in its entirety, designated by reference character C. This burner is positioned in a short compartment 31, which is formed in the bottom of chimney 25 by means of a flanged annular ring 35, suitably secured to the chimney. The mouth of burner C registers with the opening 36 of the ring 35 and is provided with an outturned flange 37 which is suitably attached to ring 35. Thus burner C cooperates with member 35 to isolate the burner chamber 31 from the rest of the chimney except as will hereinafter appear.

Burner C is preferably formed as illustrated, having a bowl shaped projection 38 in its bottom, and near the bottom of which the oil supply pipe 39 is secured. We provide a multiplicity of small air inlets or orifices 40 and a tube 41 which forms a passageway to the interior of the burner from the interior of housing A and having preferably a self closing door 42. Tube 41 protrudes through the wall 25 adjacent door 17. Thus convenient access to the interior of the burner is had for inspection or igniting the oil.

We provide a manually controlled damper 43 for an opening in the wall of chimney 25, whereby a desired quantity of air may be admitted to burner chamber 31 thence passing into the burner through orifices 40. Damper 43 is positioned adjacent burner door 42 so as to be within convenient reach of the operator when door 17 is opened.

We have found it desirable to force the hot gases to closely hug the inner wall of chimney 25 and for this purpose we provide preferably a filler cylinder 45 which is open at its bottom and closed at its top as at 46. This cylinder is preferably suspended from member 27 by means of bolt 47 as illustrated, the upper end being a short distance from member 27 and the lower end preferably terminating about as illustrated in Figure 1. Thus the passing hot gases will spread over a large heat transfer area and have a considerable distance to travel from the burner to outlet 28, as indicated by double pointed arrows. Cylinder 45 will normally be filled with burnt gases which will act to some extent to soften the vibrations set up by the burner. It is desired to prevent a possible accumulation of explosive gases in this cylinder. For this purpose we provide a small orifice 44; thus there will always be a slow upward movement of gases through this cylinder thus to prevent a dangerous accumulation of explosive gases in the cylinder.

We provide one of more air outlets 48 at the top of duct 20 and a fan motor 49 near the inlet 15, having a fan 50 and a partition having a fan shroud 51, whereby air is forced into and through base A and the space between members 20 and 25 as indicated by single pointed arrows.

It will be noted that the air is caused to contact a large area and travel a considerable distance before reaching outlet 48. Thus the large heat transfer area and time element will insure economical heat transfer between the hot gases and recirculated air.

Obviously there will be some air pressure in base A, therefore the desired amount of air for supporting combustion will pass into chamber 31 through the proper adjustment of damper 43, thence into the burner through orifices 40. The air pressure in base A and duct 20 will obviously always be greater than the pressure within burner C and chimney 25; therefore there can never be leakage of gas from the chimney into the air passageway.

We shall now describe our preferred form of temperature and fuel control with particular reference to Fig. 10. It is desirable, for obvious reasons, to provide a constant oil pressure at the control valve. Therefore, we provide a chamber 59, positioned preferably in base A as illustrated. Valve 60 is operatively connected to the supply tank 61 by means of pipe 62; valve 60 is operatively connected to float 64 by means of float arm 63 whereby a predetermined fuel level is maintained in chamber 59.

A pipe 65 operatively connects chamber 59 to control valve 66. This valve is preferably adapted to control the supply of oil to the burner by means of thermostat 68. This thermostat is positioned in the room served and is operatively connected to a suitable source of electricity and to an electrically operated member 69, which in turn, is operatively connected to a pivoted arm 70 which is, in turn, operatively connected to valve 66, whereby when the thermostat calls for a higher temperature, member 69 will be caused to open valve 66 thus allowing an extra quantity of oil to flow into the burner; and when the thermostat calls for a lower temperature, it will then act to cause member 69 to close valve 66. We may however, elect to use a thermostat having preferably a thermally sensitive liquid or gas which will act to operate valve 66 by means of a direct mechanical connection, in the well known manner, the electric thermal control as shown being preferable when a part or all of the air is taken from the outside.

It will be noted that we provide an adjusting screw 71 whereby the open position of the valve may be controlled so as to regulate the flow of oil to the burner; and when the valve is in its closed position, adjusting screw 72 may be set to thereby hold the valve slightly open, thus to keep up a constant low flame independent of the thermostat. We provide a glass flow indicator 75 whereby the operator will be able to observe the flow or dripping of the oil when the valve is in either position and make desired adjustments.

We provide an overflow pipe 76 which may lead directly to the outside of the building. This overflow pipe is connected to feed pipe 39 at a point so as to drain any surplus oil before it rises high enough to flow into outlet 41 and before it reaches the lowest orifice 40.

It will be noted that we provide an easy curve in pipe 39 as at 77, and a curved extension 78 is provided, the end of which extends above the overflow 76 whereby a flexible shaft may be inserted, while the burner is in operation, with which to clean pipe 39, especially at its connection to bowl 38 where it may become clogged with carbon.

Figure 4:
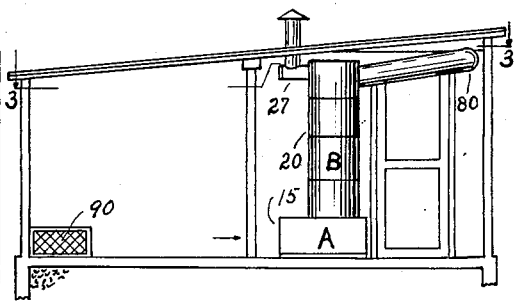
Fig. 4 is an end view of the device as shown in Figure 3, the front wall being removed on line 4—4 of Figure 3.
Figure 5:
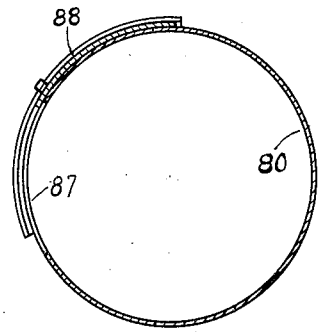
Fig. 5 is a sectional view of the air duct taken on line 5—5 of Figure 6.
Figure 6:
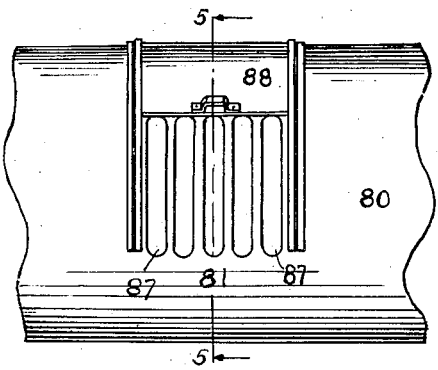
Fig. 6 is a fractional side view of the air duct illustrating one of the outlet grilles.

We shall now further described our invention by referring to Figures 3, 4, and 5. In Figures 3 and 4 we illustrate our heating unit as positioned in the end room 89 of a poultry house. It will be noted that the delivery duct 80 is located near the ceiling and extends to within a short distance of the rear end of the coop. This duct is provided with spaced outlets as at 81, 82, 83, 84, 85, and 86. These outlets are preferably formed by means of closely spaced transverse slits 87 (see Figure 6) and positioned so the air is discharged preferably horizontally. We have learned by experience that, in order to secure an equal discharge of air in the spaced outlets in duct 80, it requires a gradually reduced opening, beginning nearest the unit; therefore we preferably provide a varying number of slits. In Figure 3 each arrow may be taken as indicating an opening or slit, as an estimated arrangement for the installation as shown.

We may however, elect to use large single openings. In either event we provide preferably, a damper 88 whereby close adjustments at each opening may be had. In Figures 3 and 4 we illustrate one air duct leading from the unit. In some installations two or more of these ducts may be found necessary.

The air will be discharged as indicated by arrows and will spread out over the entire area of the coop, finding its way toward the floor and back to room 89 through grille 90, thence to inlet 15 of the unit. If however, room 89 is positioned in the center of a long coop, two ducts similar to 80 will lead in opposite directions. A grille will then be necessary in each partition.

In Figures 7, 8 and 9 we illustrate a modification wherein a grille is formed by means of closely spaced slits 91, around the top of a vertical duct 92; thus when the unit is positioned in a room as in Figures 8 and 9, the air will be discharged horizontally in all directions and by so doing, it will move over the entire area of the coop and find its way to the floor and back to inlet 15, as indicated by arrows.

In this design we also illustrate another modification wherein the hot gases are deflected against the wall of chimney 25 by means of disks 93 which are supported by means of a bolt 94 which is secured to member 27 similar to the manner in which drum 45 is suspended. In the design shown in Figures 7, 8, and 9 we may in some installations dispense with the fan relying upon the natural draft caused by the heated air as it passes through the device.

Clearly the recirculated air and hot gases from the burner are in direct heat exchange contact through a uniformly thin sheet of metal, over a very large area and combustion will be perfect because of the manner of supplying air to the burner.

Obviously the applicants' device will move all of the air in the enclosure, but at a speed which will be imperceptible in the zone occupied by the birds or animals. This insures a uniform temperature in the room. It will be noted that the heated portion of the unit is entirely enclosed by the fast moving, recirculated air and therefore the temperature of the exposed part of the unit will be about the same as the temperature of the room, and if the unit is positioned in the room occupied by the birds or animals, there will be no warm zones around the unit where they may congregate.

One of the novel features of the applicants' device is that unit B is made to extend to or near the ceiling whereby the air ducts may extend to the room served without sharp elbows or curves; or in the design shown in Figure 7, the heated air may be discharged directly into the room near the ceiling.

It will be understood that we do not wish to be limited to the specific fuel controlling means shown and described and that other details of construction herein illustrated and described may be altered in many ways, some of which have been heretofore suggested, without departing from the spirit and scope of the appended claims.

Having thus shown and described our invention, we claim:

1. An air circulating and heating device of the class described, comprising in combination, a horizontally extended base having an air inlet at one end and a vertically extended elongated housing positioned on the other end and being adapted to thereby form an L-shaped air chamber, an air outlet at the top of said housing, a uniform chimney centrally positioned in said housing and adapted to extend from the top of the housing to the bottom of said base, forming an air passageway therearound from its bottom to said air outlet, an outlet duct in the top of said chimney being adapted for the escape of burnt gases to the exterior of said housing, a burner in the bottom of said chimney having means to thereby form a closed compartment therefor, a passageway from the exterior of said chimney to the interior of said burner having a removable closure, an adjustable air passageway in the wall of said burner compartment, an access door in said base being positioned adjacent said burner passageway, a uniform tube positioned in the upper end of said chimney and extending from near the top of the chimney to within a relatively short distance from the outlet of said burner, the upper end of said tube being closed and the bottom being open, a relatively small orifice in the top of said tube thereby to permit a limited volume of burnt gases to pass through said tube and into the top of said chimney.

2. An air circulating and heating device of the class described, comprising in combination, an elongated vertically positioned housing having therein a uniform chimney extending from the bottom to the top thereof and being positioned to thereby provide an air passageway therearound, an air inlet at the bottom and an air outlet at the top of said housing, an outlet duct in the top of said chimney being adapted to conduct the burnt gases to the exterior of said housing, a burner in the bottom of said chimney having means to thereby form a closed compartment therefor, a passageway from the exterior of said chimney to the interior of said burner and having a removable closure, an adjustable air passageway in the wall of said burner compartment, an access door in said housing being positioned adjacent said burner passageway, a uniform centrally positioned tube in the upper end of said chimney and extending from the top or near the top of the chimney to within a relatively short distance from the outlet of said burner, the upper end of said tube being closed and the bottom being open, a relatively small orifice in the top of said tube thereby to permit a limited volume of burnt gases to pass through said tube and into the top of said chimney.

3. An air recirculating and heating device of the class described, comprising in combination, an elongated vertically positioned housing having therein a uniform chimney extending from the bottom to near the top of said housing and being positioned to thereby provide an air passageway therearound, an air inlet at the bottom and an air outlet at the top of said housing, said chimney having means at its top for the passage of burnt gases to the exterior of said housing, a burner in the bottom of said chimney having means to thereby form a closed compartment therefor, a passageway from the exterior of said chimney to the interior of said burner and having a removable closure, an adjustable air passageway in the wall of said burner compartment, an access door in said housing positioned adjacent said burner passageway, a uniform centrally positioned tube in the upper end of said chimney and extending from the top of the chimney to within a relatively short distance of the outlet of said burner, the upper end of said tube being closed and the bottom being open, a blower fan positioned in said housing inlet to thereby force air through said housing and around said chimney to said housing outlet.

4. An air circulating and heating device of the class described, comprising in combination, an elongated vertically positioned housing having therein a uniform chimney extending from the bottom thereof to near the top of said housing and being positioned to thereby provide an air passageway therearound, an air inlet at the bottom of and an air outlet at the top of said housing, an outlet duct from the top of said chimney and extending through said air passageway and housing, a burner in the bottom of said chimney having means to thereby form a closed compartment therefor, a passageway from the exterior of said chimney to the interior of said burner and having a removable closure, an adjustable air passageway in the wall of said burner compartment, an access door in said housing being positoned adjacent said burner passageway, a uniform centrally positioned tube in the upper end of said chimney and extending from near the top of the chimney to within a relatively short distance from said burner, the upper end of said tube being closed and the other end being open, a relatively small orifice in the top of said tube to thereby permit a limited volume of gases to escape into the top of said chimney, a blower fan positioned in said housing inlet and being adapted to force air around said chimney and through said air outlet.

5. An air circulating and heating device of the class described, comprising in combination, an elongated vertically positioned housing having an air outlet at its top and an air inlet at its bottom, a uniform chimney positioned in said housing and extending from the bottom to the top of or near the top of said housing, forming an air passageway therearound from its bottom to said air outlet, an outlet duct in the top of said chimney being adapted for the passage of burnt gases to the exterior of said housing, a burner in the bottom of said chimney having means to thereby form a closed compartment therefor, a passageway from the exterior of said chimney to the interior of said burner and having a removable closure, an adjustable air passageway in the wall of said burner compartment, an access door in said housing being positioned adjacent said burner passageway, a uniform centrally positioned tube in the upper end of said chimney and extending from the top or near the top of the chimney to within a relatively short distance from the outlet of said burner, the upper end of said tube being closed and the bottom being open, a relatively small orifice in the top of said tube thereby to permit a limited volume of burnt gases to pass through said tube and into the top of said chimney, said housing air outlet comprising a multiplicity of closely spaced vertical slots forming a grille extending around the top of said housing.

WILLIAM M. WILLETT.
GEORGE T. MARKEY.